US012753108B2

(12) United States Patent
Dainese, Jr. et al.

(10) Patent No.: US 12,753,108 B2
(45) Date of Patent: Oct. 6, 2026

(54) HOLLOW CORE OPTICAL FIBERS AND METHODS OF MAKING

(71) Applicant: CORNING INCORPORATED, Corning, NY (US)

(72) Inventors: Paulo Clovis Dainese, Jr., Painted Post, NY (US); Sushmit Sunil Kumar Goyal, Painted Post, NY (US); Kam Chuen Ng, Rochester, NY (US); Matthew Artus Tuggle, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 249 days.

(21) Appl. No.: 18/387,646

(22) Filed: Nov. 7, 2023

(65) Prior Publication Data

US 2024/0150219 A1 May 9, 2024

Related U.S. Application Data

(60) Provisional application No. 63/423,562, filed on Nov. 8, 2022.

(51) Int. Cl.
*C03B 37/027* (2006.01)
*C03B 37/012* (2006.01)

(52) U.S. Cl.
CPC .. *C03B 37/02718* (2013.01); *C03B 37/01214* (2013.01); *C03B 2203/16* (2013.01)

(58) Field of Classification Search
None
See application file for complete search history.

(56) References Cited

U.S. PATENT DOCUMENTS

| | | | | |
|---|---|---|---|---|
| 11,203,547 | B2 | 12/2021 | Corrado et al. | |
| 2003/0230118 | A1 | 12/2003 | Dawes et al. | |
| 2009/0260401 | A1 * | 10/2009 | Shin | C03B 37/029 65/435 |
| 2011/0058780 | A1 | 3/2011 | Han et al. | |

(Continued)

FOREIGN PATENT DOCUMENTS

| | | | |
|---|---|---|---|
| IN | 202247001691 | | 2/2022 |
| WO | 2021/009213 | A1 | 1/2021 |

OTHER PUBLICATIONS

Britannica, "Ideal gas law", https://www.britannica.com/science/ideal-gas-law, retrieved online Oct. 17, 2025. (Year: 2025).*

(Continued)

*Primary Examiner* — Lisa L Herring
(74) *Attorney, Agent, or Firm* — Kevin L. Bray

(57) ABSTRACT

A method of manufacturing a hollow core optical fiber, the method including positioning at least one glass tube in a glass outer cladding to form a preform precursor, the glass tube comprising a first open end and a second open end, and forming a preform from the preform precursor. The method further including drawing the preform into a hollow core optical fiber and, while drawing the preform, thermally treating the preform to manipulate gas pressure within the glass tube by at least one of (i) heating at least a portion of the preform to increase gas pressure within the glass tube and (ii) cooling at least a portion of the preform to decrease gas pressure within the glass tube.

18 Claims, 7 Drawing Sheets

(56) References Cited

U.S. PATENT DOCUMENTS

| | | | | |
|---|---|---|---|---|
| 2015/0329403 | A1 | 11/2015 | Adigrat et al. | |
| 2020/0278491 | A1* | 9/2020 | Poletti | G02B 6/02357 |
| 2021/0292223 | A1* | 9/2021 | Hosokawa | G02B 6/03694 |
| 2022/0234936 | A1 | 7/2022 | Rosenberger et al. | |
| 2022/0267192 | A1* | 8/2022 | Rosenberger | C03B 37/0122 |
| 2022/0357506 | A1 | 11/2022 | Rosenberger et al. | |
| 2023/0011708 | A1* | 1/2023 | Sandoghchi | C03B 37/0124 |
| 2024/0036249 | A1 | 2/2024 | Drake et al. | |
| 2025/0313504 | A1* | 10/2025 | Uebel | C03B 37/0122 |

OTHER PUBLICATIONS

Denisov et al; “Fabrication of Microstructured Optical Fibres by Drawing Preforms Sealed at Their Top End”; Quantum Electronics 46 (11) 1031-1039 (2016).

Voyce et al; “Mathematical Modeling of the Self-Pressurizing Mechanism for Microstructured Fiber Drawing”; Journal of Lightwave Technology, vol. 27, No. 7 Apr. 1, 2009; pp. 871-878.

Britannica, “Ideal gas law”, https://www.britannica.com/science/ideal-gas-law, retrieved online Oct. 17, 2025, 2 pages.

* cited by examiner

HOLLOW CORE OPTICAL FIBERS AND METHODS OF MAKING

This application claims the benefit of priority of U.S. Provisional Application Ser. No. 63/423,562 filed on Nov. 8, 2022, the content of which is relied upon and incorporated herein by reference in its entirety.

FIELD OF THE DISCLOSURE

The present disclosure is generally directed to hollow core optical fibers, and more specifically to anti-resonant hollow core optical fibers including methods of making thereof.

BACKGROUND OF THE DISCLOSURE

Anti-resonant hollow core optical fibers are traditionally comprised of a hollow, outer cladding in which a plurality of structural tubes are arranged. The structural tubes have a smaller diameter and thickness than the outer cladding. Each structural tube is bonded to an inner surface of the outer cladding such that the structural tubes are arranged about the inner circumference of the outer cladding. Furthermore, each structural tube runs parallel to a length of the outer cladding. A central portion of the outer cladding, around which the structural tubes are arranged, remains empty as an air-filled void. The resulting anti-resonant fiber guides light through the empty-central portion of the core. Such anti-resonant fibers are able to provide reduced optical loss of signal.

The structural tubes must have specific dimensions in order to transmit the optical signal within the air-filled void formed by the outer cladding. If the structural tubes are not made with such specific dimensions, the structural tubes will not act as anti-resonant members at a predetermined wavelength. However, producing structural tubes with precise dimensions in hollow core optical fibers is extremely difficult.

SUMMARY OF THE DISCLOSURE

An exemplary approach to solve the object is described by the independent claims. Various embodiments are defined with the dependent claims.

The present disclosure is directed to a hollow core optical fiber and methods of making thereof. According to aspects of the present disclosure, structural tubes are manufactured to have precise dimensions. More specifically, the structural tubes are manufactured so that an inner capillary, formed by the structural tubes, has a specific size and so that a wall thickness of the structural tubes has a specific size. Such allows the structural tube to be tuned to provide anti-resonance for predetermined wavelengths. In some embodiments, the structural tubes are specifically sized so that the structural tubes provide anti-resonance for wavelengths of about 1550 nm.

The structural tubes may be formed with such precise size dimensions by first forming glass tubes. The glass tubes are positioned around an inner cladding of a precursor to the hollow core optical fiber. Then, the glass tubes are either heated or cooled to manipulate the gas pressure within the glass tubes. An increase in temperature causes the gas pressure to increase, thus causing the structural tubes to be formed with a relatively larger capillary size and a relatively smaller wall thickness. A decrease in temperature causes the gas pressure to decrease, thus causing the structural tubes to be formed with a relatively smaller capillary size and a relatively larger wall thickness. One or more glass tubes may be manipulated separate and differently from one or more other glass tubes. The resulting hollow core optical fiber may be formed with precise dimensions so as to provide superior transmission of an optical signal.

Embodiments of the present disclosure are directed to a method of manufacturing a hollow core optical fiber, the method comprising positioning at least one glass tube in a glass outer cladding to form a preform precursor, the glass tube comprising a first open end and a second open end, and forming a preform from the preform precursor. The method further comprising drawing the preform into a hollow core optical fiber and, while drawing the preform, thermally treating the preform to manipulate gas pressure within the glass tube by at least one of (i) heating at least a portion of the preform to increase gas pressure within the glass tube and (ii) cooling at least a portion of the preform to decrease gas pressure within the glass tube.

Although many different embodiments are listed, the embodiments may exist individually or in any combination as possible. Hereinafter exemplary embodiments are shown and described.

DETAILED DESCRIPTION

Figure 1A:
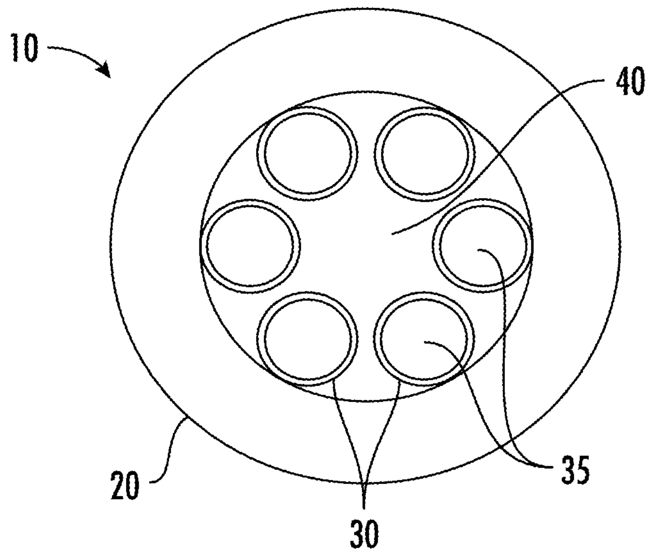
FIG. 1A illustrates a cross-sectional view of an exemplary hollow core optical fiber, according to embodiments of the present disclosure.

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It is also important to note that the construction and arrangement of the elements of the disclosure, as shown in the exemplary embodiments, is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel and nonobvious teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present disclosure. Other substitutions, modifications, changes, and omissions may be made in the design, operating conditions, and arrangement of the desired and other exemplary embodiments without departing from the spirit of the present disclosure.

Reference will now be made in detail to the present preferred embodiments of the disclosure, examples of which are illustrated in the accompanying drawings. Whenever possible, the same reference numbers will be used throughout the drawings to refer to the same or like parts.

As is known in the art, the behavior of gas is dictated by gas law such as the ideal gas law: $PV=nRT$, where P is the pressure of the gas, V is the volume of the gas, n is the number of moles of the gas, R is the ideal gas constant, and T is the temperature of the gas. The ideal gas law shows the relationship between pressure, volume, temperature, and number of moles of a gas. Aspects of the present disclosure utilize these relationships to efficiently produce hollow core optical fibers with specific dimensions. In some aspects of the present disclosure, the relationship between pressure, volume, temperature, and number of moles of a gas is utilized to efficiently produce the hollow core optical fibers. According to the embodiments of the present disclosure, hollow core optical fibers can be easily produced to have specific dimensions, including specific diameter sizes and wall thickness values.

Referring now to FIG. 1A, an exemplary cross-sectional view of a hollow core optical fiber 10 is shown. Fiber 10 comprises an outer cladding 20, one or more structural tubes 30, and a hollow core 40. Structural tubes 30 are disposed radially around hollow core 40, and outer cladding 20 is disposed radially around structural tubes 30.

Outer cladding 20 is a hollow, cylindrical member formed of glass. Thus, outer cladding 20 has a hollow interior and forms a ring-like, donut shape in cross-section (as shown in FIG. 1A). In some embodiments, outer cladding 20 is formed of doped or undoped silica glass. Outer cladding 20 may have a length from about 10 cm to about 2 m, or about 25 cm to about 1.5 m, or about 50 cm to about 1 m.

Structural tubes 30 are glass tubes disposed within the hollow interior of outer cladding 20. Similar to outer cladding 20, structural tubes 30 are hollow, cylindrical members formed of glass. Thus, structural tubes 30 each form a ring-like, donut shape in cross-section (as shown in FIG. 1A). In some embodiments, structural tubes 30 are formed of doped or undoped silica glass. Structural tubes 30 may each have a length that extends the length (or substantially the length) of outer cladding 20. Thus, structural tubes 30 and outer cladding 20 may have the same length.

As shown in FIG. 1A, the hollow interior of each structural tube 30 forms a capillary 35 through which gas can flow, such as, for example, ambient air or nitrogen gas. As used herein, capillaries 35 are lumens formed by the walls of structural tubes 30. An outer diameter of each capillary 35 is defined by an inner diameter of each structural tube 30. A wall thickness of structural tubes 30 is carefully selected to optimize anti-resonant conditions in hollow core 40.

Hollow core 40 may be formed and defined by the outer profile of structural tubes 30. Thus, an outer surface of structural tubes 30 forms an outer diameter of hollow core 40. When in use, light is guided through the air in hollow core 40 along fiber 10. Structural tubes 30 help to maintain the light within hollow core 40. Such provides transmission of optical signals along fiber 10 with reduced transmission loss.

In some embodiments, hollow core optical fiber 10 is an anti-resonant hollow core optical fiber. As is known in the art, anti-resonant fibers are one type of hollow core fibers. There are three types of hollow core fibers. The first type is Bragg hollow core fibers in which the cladding is a Bragg structure of concentric periodic dielectric multilayers that confine light in a hollow (air) region. The second type is photonic bandgap hollow core fibers that use a two-dimensional photonic crystal structure with periodically arranged air holes that confine light in the hollow core region. The third type is anti-resonant hollow core fibers in which the fiber comprises one or more layers of thin glass structural tubes to prevent light from leaking out of the air core.

It is also noted that structural tubes 30 may be positioned in various configurations around an inner diameter of outer cladding 20. FIG. 1A shows a first embodiment in which fiber 10 comprises six structural tubes 30 evenly spaced around the inner diameter of outer cladding 20. However, fiber 10 may comprise more or less structural tubes 30. For example, fiber 10 may comprise two, three, four, five, seven, eight, nine, ten, eleven, twelve, or more structural tubes 30. Furthermore, structural tubes 30 may be evenly spaced apart from each other, or structural tubes 30 may be spaced apart inconsistently from each other. In yet some embodiments, one or more structural tubes 30 may be in contact with an adjacent structural tube 30 at a contact point. However, in general, adjacent structural tubes 30 are typically separated by a gap so as to avoid the formation of a waveguide at the contact point. More specifically, such a contact point between two structural tubes can form an increased wall thickness at the contact point (due to the additive wall thickness of the two structural tubes). The increased wall thickness forms a waveguiding region, which lowers the attenuation of the optical fiber.

Figure 1B:
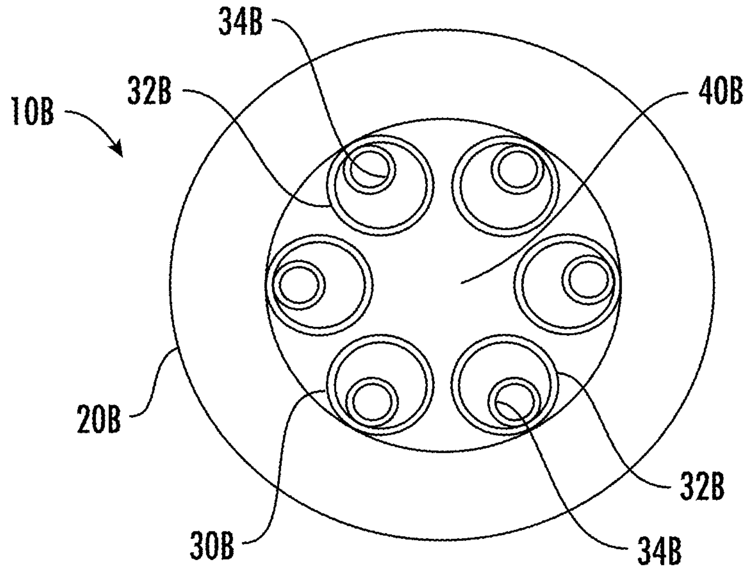
FIG. 1B illustrates a cross-sectional view of another exemplary hollow core optical fiber, according to embodiments of the present disclosure.

FIG. 1B shows an embodiment in which fiber 10B comprises nested structural tubes 30B. More specifically, structural tubes 30B comprise an outer tube 32B (a first structural tube) and an inner tube 34B (a second structural tube) such that inner tube 34B is nested within outer tube 32B. It also noted that fiber 10B comprises an outer cladding 20B and a hollow core 40B, similar to the embodiment of FIG. 1A. Furthermore, the present disclosure is not limited to the exemplary arrangements disclosed herein. Other embodiments and arrangements of structural tubes are also contemplated.

Figure 1C:
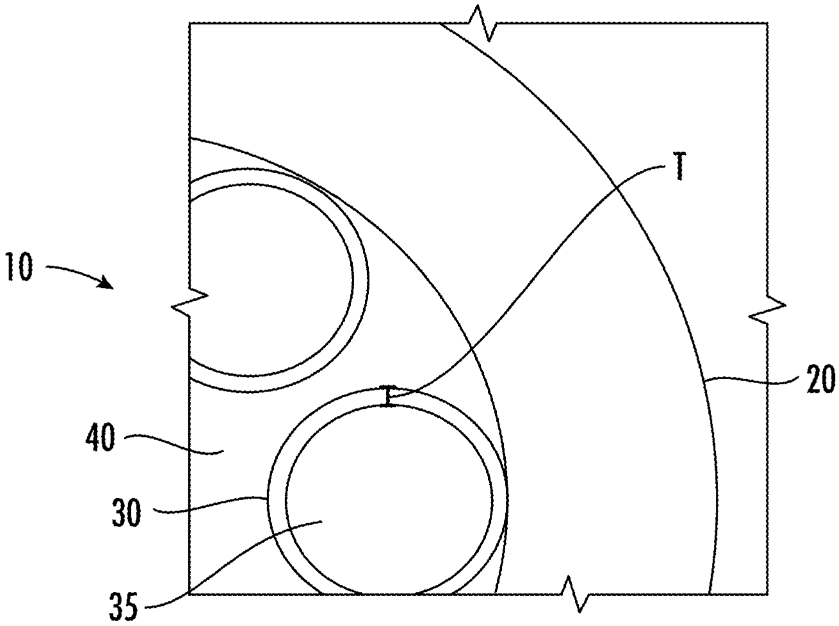
FIG. 1C illustrates an enlarged view of a portion of the exemplary hollow core optical fiber of FIG. 1A, according to embodiments of the present disclosure.

Each structural tube 30 may be formed to have various sizes, including various inner and outer diameters and various wall thickness values. As shown in FIG. 1C, structural tubes 30 have a wall thickness dimension T, which is defined by the inner and outer diameters of the structural tube. The size of structural tubes 30 (including the inner diameter, outer diameter, and wall thickness) is important to reduce attenuation and to shift the transmission window to a desired wavelength. Thus, embodiments of the present disclosure are directed towards processes and methods to control the size of the structural tubes, including the inner and outer diameter dimensions of the structural tubes and their wall thickness. Such dimensions also affect the size of capillaries 35 formed by structural tubes 30. The processes and methods disclosed herein to control the size of the structural tubes may be performed during the drawing of the preform into an optical fiber, as discussed below.

Figure 2:
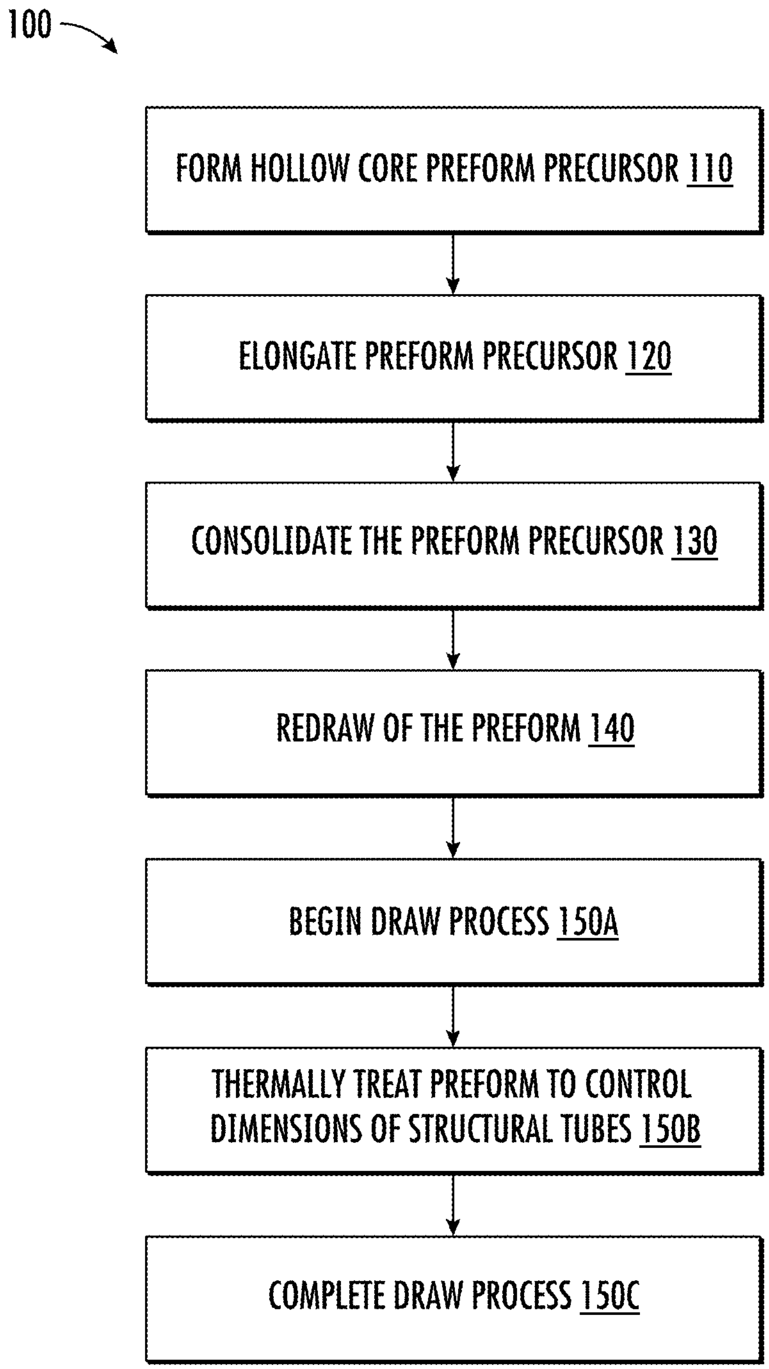
FIG. 2 illustrates a process for producing a hollow core optical fiber, according to embodiments of the present disclosure.
Figure 3A:
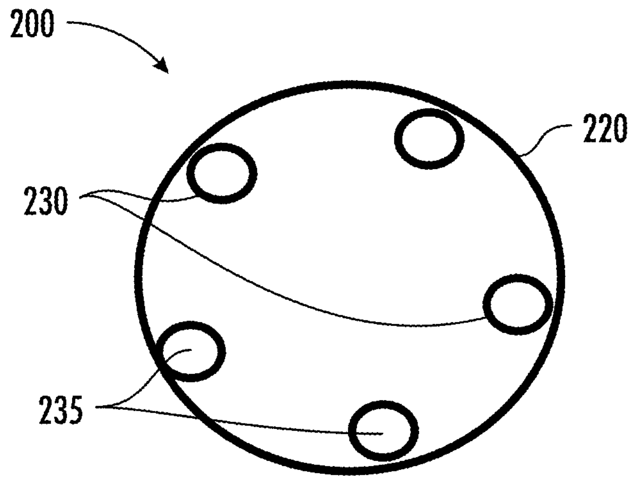
FIG. 3A illustrates a cross-sectional view of an exemplary preform precursor to a hollow core optical fiber, according to embodiments of the present disclosure.
Figure 3B:
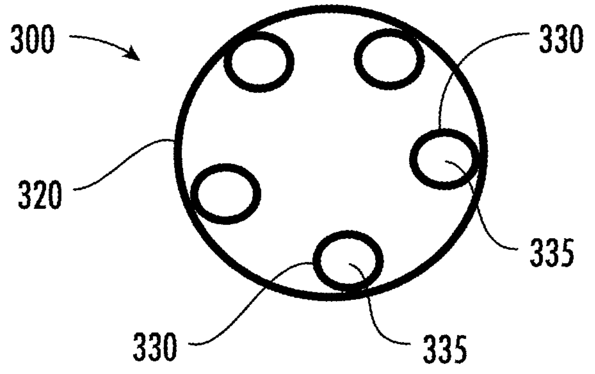
FIG. 3B illustrates a cross-sectional view of an exemplary preform to a hollow core optical fiber, according to embodiments of the present disclosure.

FIG. 2 provides an exemplary process 100 to produce a hollow core optical fiber. Step 110 of process 100 comprises forming a hollow core preform precursor, which is a precursor to a hollow core preform. As discussed further below, in embodiments, the preform precursor forms the preform after the consolidation step, and the preform can then be exposed to a redraw step before being drawn into a hollow core optical fiber. In some embodiments, step 110 of process 100 specifically comprises inserting one more glass tubes into a glass cladding tube to form the preform precursor. FIG. 3A shows an exemplary embodiment of glass tubes 230 inserted into a glass cladding tube 220 in a preform precursor 200. As shown in FIG. 3A, glass tubes 230 comprise inner capillaries 235. Glass tubes 230 become structural tubes 30 in the drawn optical fiber, and glass cladding tube 220 becomes outer cladding 20 in the drawn optical fiber. The preform precursor formed in step 110 (e.g., preform precursor 200) may be a precursor to preform 300 of FIG. 3B. It is noted that FIG. 3A shows an exemplary preform precursor 200 and that FIG. 3B shows an exemplary preform 300. However, embodiments of the present disclosure, including the steps of process 100, may be used with preform precursors and preforms having other configurations than those shown in FIGS. 3A and 3B. Reference to the specific embodiments of FIGS. 3A and 3B with regard to the steps of process 100 are used for illustrative purposes only.

Referring again to FIG. 2, at step 120 of process 100, preform precursor 200 is heated to a temperature above the softening point of glass to elongate and stretch preform precursor 200 into a smaller diameter preform precursor. Such causes inner capillaries 235 and glass tubes 230 to extend in length.

At step 130 of process 100, preform precursor 200 is heated to consolidate the glass. During consolidation, preform precursor 200 may be placed inside a furnace and heated to a temperature above the sintering temperature of the glass, which may be a temperature from about 1400° C. to about 2000° C., or about 1500° C. to about 1900° C., or about 1600° C. to about 1800° C., or about 1675° C. to about 1800° C., or about 1800° C. to about 1950° C., or about 1700° C. The glass may also be subjected to chlorine gas to remove impurities and reduce water content of the glass. Additional layers of soot may be applied to the preform precursor followed by additional consolidation steps. After the final consolidation step, a preform is formed. FIG. 3B shows an exemplary preform 300 that comprises glass tubes 330 disposed within a glass cladding tube 320. Glass tubes 330 comprise inner capillaries 335. Furthermore, glass tubes 330 become structural tubes 30 in the drawn optical fiber, and glass cladding tube 320 becomes outer cladding 20 in the drawn optical fiber. In embodiments, an outer diameter of preform 300 is less than an outer diameter of preform precursor 200.

Step 140 of process 100 comprises exposing preform 300 to a redraw step before the preform is drawn into an optical fiber. More specifically, at step 140, preform 300 is heated to a temperature above the softening point of glass to stretch preform 300 into a smaller diameter preform. At the conclusion of step 140, preform 300 may be ready for drawing into an optical fiber.

The drawing of preform 300 into an optical fiber begins at step 150*a* of process 100. Such comprises heating a bottom portion of preform 300 to the softening point of the glass (about 200° C. or greater) while applying tension to the glass to draw the glass downward into a smaller diameter fiber. As is known in the art, the drawing of preform 300 into an optical fiber may take place within a draw furnace. It is noted that in traditional draw processes, the bottom portion of a preform is heated by a bottom heater in the draw furnace to draw the glass downward, while a top portion of the preform is not separately heated (other than the circulating heat from the bottom heater). Therefore, the top portion of the preform, in a traditional draw process, is typically maintained at a temperature below the strain point of the glass and less than 200° C.

Referring again to process 100 of FIG. 2, after the start of the draw process, next, in step 150*b*, preform 300 is thermally treated to control the dimensions of structural tubes 30 in the optical fiber drawn from preform 300. As discussed further below, the thermal treatment of preform 300 comprises cooling and/or heating the top portion of preform 300. It is noted that the thermal treatment of step 150*b* occurs after the start of the draw process in step 150*a*. Therefore, the thermal treatment of step 150*b* occurs during the process of drawing preform 300 into an optical fiber (and, more specifically, drawing the process of drawing preform 300 into a hollow core optical fiber). Furthermore, the thermal treatment of step 150*b* may occur simultaneously while preform 300 is being heated by a bottom heater and drawn downward into an optical fiber. It is noted that the thermal treatment of step 150*b* may occur during the remainder of the fiber drawing process or for only a shortened, temporary amount of time during the fiber drawing process.

At step 150*c* of process 100, the fiber drawing process is completed. Such may occur when all of the required or designated amount of preform is drawn into an optical fiber.

It is also noted that in some embodiments, process 100 may comprise more or less steps than shown in FIG. 2. For example, in some embodiments, process 100 does not include redraw step 140. Therefore, in these embodiments, the preform may be drawn into the optical fiber without being exposed to a redraw step. In yet some other embodiments, process 100 does not comprise the elongation of the preform at step 120 and/or the consolidation at step 130.

As discussed above, embodiments of the present disclosure comprise thermally treating preform 300 to control dimensions of structural tubes 30 in the drawn optical fiber. In particular, a top portion of preform 300 is thermally treated (during step 150*b* of process 100) to control the capillary size and structural tube wall thickness in the drawn optical fiber. As discussed further below, thermally treating preform 300 comprises modifying the gas pressure of capillaries 335 within glass tubes 330.

Figure 4:
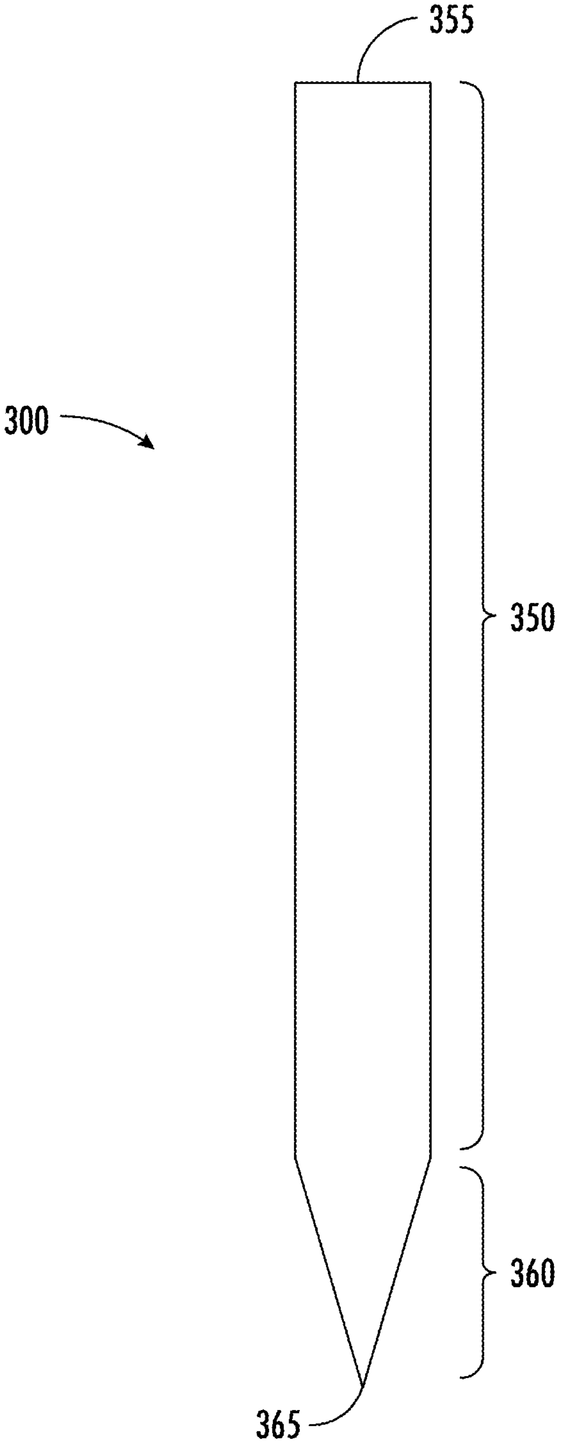
FIG. 4 illustrates a preform for producing a hollow core optical fiber, according to embodiments of the present disclosure.

FIG. 4 shows a top portion (first section 350) and a bottom portion (second section 360) of preform 300. In particular, second section 360 of preform 300 may also be referred to as a root forming portion. First section 350 may be any portion(s) of preform 300 above the root forming portion. As discussed above, during the draw of preform 300 into an optical fiber, second section 360 is heated to a temperature above the softening point of glass to draw the glass downward within this section of the preform. In embodiments, second section 360 is heated to a temperature of about 200° C. or greater. Furthermore, the thermal treatment of step 150*b* comprises heating and/or cooling first section 350 of preform 300 to control the capillary size and structural tube wall thickness in the drawn optical fiber. In particular, the gas within capillaries 335 in first section 350 of preform 300 is heated and/or cooled during the thermal treatment step. Because the ends of glass tubes 330 are sealed, the volume and number of moles of gas within capillaries 335 remains constant during the thermal treatment step. Due to the constant volume and number of moles of gas within the capillaries, heating or cooling the gas within the capillaries causes the capillaries to expand or contract, respectively.

In particular, heating the gas within capillaries 335 causes gas pressure within the capillaries to increases (due to the relationship defined by the equation PV=nRT). An increase in gas pressure within capillaries 335 causes the capillaries to expand in size, thus causing the wall thickness of glass tubes 330 to decrease. This further causes the capillaries in preform 300 to have a relatively larger outer diameter and for glass tubes 330 to have a relatively smaller wall thickness. Such further causes the capillaries in the drawn optical fiber 10 to have a relatively larger outer diameter and for structural tubes 30 in the drawn optical fiber 10 to have a relatively smaller wall thickness.

Figure 3C:
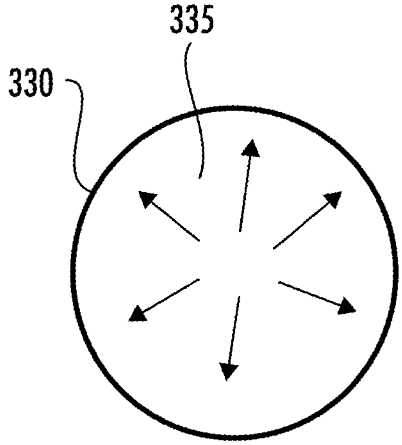
FIG. 3C illustrates radially outward pressure exerted on the walls of a glass tube of the preform of FIG. 3B, according to embodiments of the present disclosure.

As an example, FIG. 3C depicts the radially outward pressure on the walls of a glass tube 330 from the increased gas pressure within capillary 335. As shown in FIG. 3C, the radially outward pressure causes the capillary 335 to inflate and expand in size, similar to a balloon, while the walls of glass tube 330 stretch and become thinner to accommodate the larger inner capillary size. Due to the relatively thinner walls of the glass tubes 330, less effort is needed to expand the glass tubes 330 during the fiber drawing step. Therefore, during the fiber drawing step, the glass tubes 330 can more easily expand to produce structural tubes 30 with relatively larger diameters. Accordingly, after the final drawing step, the produced structural tubes 30 are relatively larger in size with relatively larger capillaries 35.

Conversely, cooling the gas within capillaries 335 causes gas pressure within the capillaries to decrease (due to the relationship defined by the equation PV=nRT). A decrease in gas pressure within capillaries 335 causes the capillaries to reduce in size, thus causing the wall thickness of glass tubes 330 to increase. This further causes the capillaries in preform 300 to have a relatively smaller outer diameter and for glass tubes 300 to have a relatively larger wall thickness. Such further causes the capillaries in the drawn optical fiber 10 to have a relatively smaller outer diameter and for structural tubes 30 in the drawn optical fiber 10 to have a relatively larger wall thickness. More specifically, due to the decreased gas pressure within capillaries 335 of preform 300, capillaries 335 deflate and are then relatively smaller in size, while a wall thickness of glass tubes 330 increases. Due to the increased wall thickness, more effort is needed to expand the glass tubes 330 during the fiber drawing step. Therefore, during the fiber drawing step, the glass tubes 330 cannot expand as easily and, thus, produce structural tubes 30 with relatively smaller diameters. Accordingly, after the final drawing step, the produced structural tubes 30 are relatively smaller in size with relatively smaller capillaries 35.

As discussed above, in some embodiments, the gas pressure within capillaries 335 is raised by increasing the temperature of the gas within the capillaries. In other embodiments, the gas pressure is reduced by decreasing the temperature of the gas within the capillaries. Furthermore, as discussed below, ends of glass tubes 330 are sealed to facilitate the change in pressure within the capillaries.

Figure 5:
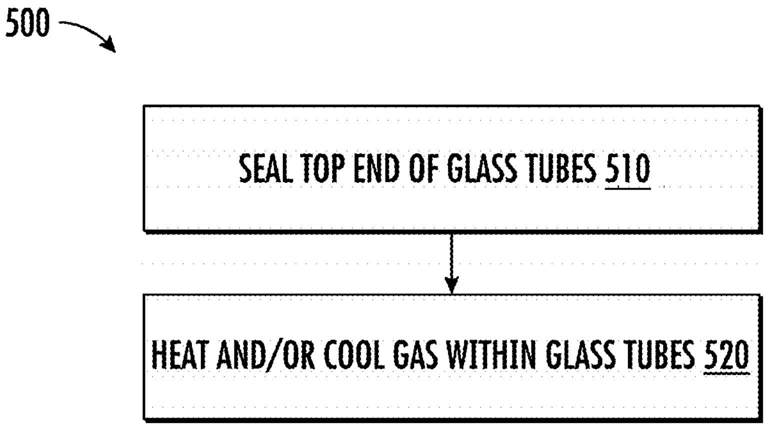
FIG. 5 illustrates a process for producing a hollow core optical fiber, according to embodiments of the present disclosure.

FIG. 5 shows a process 500 to thermally treat preform 300. Therefore, process 500 provides more detailed process steps of step 150*b* of process 100. In step 510 of process 500, a top end of glass tubes 330 is sealed. The top end of each glass tube 330 may be a top end of first section 350, such as top end 355 as shown in FIG. 4. Therefore, the top end may be disposed on an opposite side of preform 300 from the root forming portion of the preform. Sealing of the top end may be performed by welding, heating, or any other means as are known in the art. Furthermore, a bottom end of preform 300 may be effectively sealed during the beginning of the draw process (during step 150*a* of process 100). The root forming portion of preform 300 (second section 360) may taper to such a small diameter during the draw of the preform that gas is unable to enter or leave the preform at the bottom end. Therefore, the bottom end is effectively sealed. The bottom end may be an end of preform 300 at the root forming portion, such as bottom end 365 as shown in FIG. 4.

Top end 335 of preform 300 may be sealed prior to the drawing of preform (prior to step 150*a* of process 100). In some embodiments, top end 335 is sealed while the gas within capillary 335 is at room temperature (i.e., 25° C.). In other embodiments, top end 335 is sealed after step 150*a* and, thus, after the start of the drawing process.

Glass tubes 330 become closed glass tubes due to the sealing at first end 355 and at second end 365. Sealing of glass tubes 330 at ends 355, 365 maintains a constant gas volume and number of gas moles of gas within capillaries 335. With such constant gas volume and number of moles, the gas pressure within the capillaries is easily regulated and controlled by increasing or decreasing the temperature.

Step 520 of process 500 comprises heating or cooling the gas within or one or more glass tubes 330 in preform 300. As discussed above, the heating or cooling is applied to first section 350 of preform. It is noted that embodiments of the present disclosure comprise heating a first glass tube in first section 350 of preform 300 and cooling a second glass tube in first section 350 of the same preform 300. Such may be advantageous when, for example, it is desired to increase the capillary size of the first glass tube and to decrease the capillary size of the second glass tube. It is also contemplated that, during step 520, a single glass tube 330 may be heated in a first portion of first section 350 and cooled in a second portion of first section 350. Thus, in this embodiment, the single glass tube 330 is exposed to both cooling and heating during the thermal treatment of step 520.

During step 520, glass tubes 330 may be heated with, for example, a heated sleeve, ring burner, heated air blower, induction coil, torch, isothermal heating element, laser including a CO or $CO_2$ laser, plasma heater, furnace, or any other heating element as is known in the art. The heating of glass tubes 330 during step 520 is different and distinct from the heating of preform 300 to draw the preform into an optical fiber. During step 520, glass tubes 330 may be cooled with, for example, a cooling gas or liquid (such as helium or nitrogen), dry ice, refrigerator, or any other cooling element as is known in the art.

It is also noted that one or more glass tubes may not be subject to the heating/cooling of step 520. Therefore, in one exemplary embodiment, a first glass tube in preform 300 is heated to increase the capillary size of that glass tube while an adjacent second glass tube is not heated or cooled. Therefore, the capillary size of the second glass tube does not change due to the thermal treatment steps disclosed herein.

In some particular embodiments, step 520 comprises heating or cooling one or more nested glass tubes (e.g., inner tube 34B) different from one or more other glass tubes (e.g., outer tube 32B). For example, the precursor to inner tube 34B may be heated to a higher temperature than the precursor to outer tube 32B during thermal treatment step 150*b*, causing the precursor to inner tube 34B to have a relatively larger expansion rate than the precursor to outer tube 32B.

In embodiments in which one or more nested glass tubes (e.g., inner tube 34B of FIG. 1B) is heated or cooled differently from one or more other glass tubes (e.g., outer tube 32B of FIG. 1B), it is contemplated that one or more glass tubes may be sealed at their top ends while one or more glass tubes remains unsealed at their top ends. For example, the precursor to inner tube 34B may be sealed and thermally treated (during step 150*b*) while the precursor to outer tube 32B is not sealed and/or thermally treated.

In some embodiments, the glass tubes are heated or cooled uniformly along their length. In other embodiments, the glass tubes are heated or cooled inconsistently along their length. For example, it is contemplated that a glass tube may be heated such that the gas within the glass tube is heated to a first temperature in a first portion of first section 350, heated to a second temperature in a second portion of first section 350, and cooled to a third temperature in a third portion of third section 350, the first temperature being higher than the second temperature and the second temperature being higher than the third temperature and such that the first, second, and third portions are disposed longitudinally along the length of the glass tube. It yet other embodiments, the glass tubes may be inconsistently heated or cooled radially along an axial length of the glass tubes in first section 350. In these embodiments, for example, a glass tube may be heated such that the gas within the glass tube is heated to a relatively higher temperature at a radially central portion of the glass tube and heated to a relatively lower temperature at a radially peripheral portion of the glass tube. In another embodiment, a glass tube may be heated such that the gas within the glass tube is heated to a relatively higher temperature on a first radial side (e.g., left side) of the glass tube in first section 350 and heated to a relatively lower temperature on a second radial side (e.g., right side) of the glass tube in first section 350.

During step 520 of process 500, first section 350 of glass tubes 330 may be heated to a temperature of about 200° C. or greater, or about 225° C. or greater, or about 250° C. or greater, or about 275° C. or greater, or about 300° C. or greater, or about 325° C. or greater, or about 350° C. or greater, or about 375° C. or greater, or about 400° C. or greater, or about 425° C. or greater, or about 450° C. or greater, or about 475° C. or greater, or about 500° C. or greater. Additionally or alternatively, during step 520 of process 500, first section 350 of glass tubes 330 may be heated to a temperature of about 500° C. or less, or about 475° C. or less, or about 450° C. or less, or about 425° C. or less, or about 400° C. or less, or about 375° C. or less, or about 350° C. or less, or about 325° C. or less, or about 300° C. or less, or about 275° C. or less, or about 250° C. or less, or about 225° C. or less, or about 200° C. or less. In embodiments, first section 350 is heated to a temperature from about 200° C. to about 500° C., or about 200° C. to about 450° C., or about 200° C. to about 400° C., or about 250° C. to about 450° C., or about 300° C. to about 450° C. In embodiments, first section 350 is heated to a temperature that is below the strain point of the glass. During step 520 of process 500, glass tubes 330 may be heated for the entire duration of the draw. In some embodiments, during step 520, glass tubes 330 may be heated for about 99% or less, or about 95% or less, or about 90% or less, or about 85% or less, or about 80% or less, or about 75% or less, or about 70%, or about 65% or less, or about 60% or less, or about 55% or less, or about 50% or less, or about 45% or less of the duration of the draw. As discussed above, heating of glass tubes 330 in step 520 causes structural tubes 30 in the drawn optical fiber to have a larger capillary diameter and thinner walls.

Because the ends of glass tubes 330 are sealed (and, thus, the volume of gas and number of moles of the gas within the glass tubes remains constant), the heating of glass tubes 330 causes an increase in temperature of the gas within glass tubes 330, which causes the gas pressure within capillaries 335 to increase. In embodiments, the gas pressure may increase by about 0.05 psi or more, or about 0.15 psi or more, or about 0.25 psi or more, or about 0.50 psi or more, or about 0.75 psi or more, or about 1.00 psi or more, or about 1.05 psi or more, or about 1.15 psi or more, or about 1.25 psi or more, or about 1.50 psi or more, or about 1.75 psi or more, or about 2.00 psi or more, or about 2.05 psi or more, or about 2.15 psi or more, or about 2.25 psi or more, or about 2.50 psi or more, or about 2.75 psi or more, or about 3.00 psi or more. In embodiments, the gas pressure may increase from about 0.05 psi to about 3.00 psi, or about 0.15 psi to about 2.75 psi, or about 0.25 psi to about 2.50 psi, or about 0.50 psi to about 2.50 psi, or about 1.00 psi to about 2.50 psi.

During step 520 of process 500, first section 350 of glass tubes 330 may be cooled to a temperature of about 50° C. or less, or about 25° C. or less, or about 0° C. or less, or about −5° C. or less, or about −10° C. or less, or about −15° C. or less, or about −25° C. or less, or about −50° C. or less, or about −75° C. or less, or about −80° C. or less, or about −100° C. or less. Additionally or alternatively, during step 520 of process 500, first section 350 of glass tubes 330 may be cooled to a temperature of about −100° C. or greater, or about −80° C. or greater, or about −75° C. or greater, or about −50° C. or greater, or about −25° C. or greater, or about −15° C. or greater, or about −10° C. or greater, or about −5° C. or greater, or about 0° C. or greater, or about 25° C. or greater, or about 50° C. or greater. In embodiments, first section 350 of glass tubes 330 are cooled to a temperature from about −100° C. to about 50° C., or about −75° C. to about 25° C., or about −50° C. to about 0° C., or about −50° C. to about −10° C. First section 350 of glass tubes 330 is cooled to a temperature below the strain point of the glass. During step 520 of process 500, glass tubes 330 may be cooled for the entire duration of the draw. In some embodiments, during step 520, glass tubes 330 may be cooled for about 99% or less, or about 95% or less, or about 90% or less, or about 85% or less, or about 80% or less, or about 75% or less, or about 70%, or about 65% or less, or about 60% or less, or about 55% or less, or about 50% or less, or about 45% or less of the duration of the draw. As discussed above, cooling of glass tubes 330 in step 520 causes structural tubes 30 in the drawn optical fiber to have a smaller capillary diameter and thicker walls.

Because the ends of glass tubes 330 are sealed (and, thus, the volume of gas and number of moles of the gas within the glass tubes remains constant), the cooling of glass tubes 330 causes a decrease in temperature of the gas within glass tubes 330, which causes the gas pressure within capillaries 335 to decrease. In embodiments, the gas pressure may decrease by about 0.05 psi or more, or about 0.15 psi or more, or about 0.25 psi or more, or about 0.50 psi or more, or about 0.75 psi or more, or about 1.00 psi or more, or about 1.05 psi or more, or about 1.15 psi or more, or about 1.25 psi or more, or about 1.50 psi or more, or about 1.75 psi or more, or about 2.00 psi or more, or about 2.05 psi or more, or about 2.15 psi or more, or about 2.25 psi or more, or about 2.50 psi or more, or about 2.75 psi or more, or about 3.00 psi or more. In embodiments, the gas pressure may decrease from about 0.05 psi to about 3.00 psi, or about 0.15 psi to about 2.75 psi, or about 0.25 psi to about 2.50 psi, or about 0.50 psi to about 2.50 psi, or about 1.00 psi to about 2.50 psi.

It is also noted that the thermal treatment process affects the expansion or contraction amount in structural tubes 30. More specifically, a higher change in temperature (when heating the glass tubes during the thermal treatment of step **150*b*) causes a greater expansion amount than a lower change in temperature. Similarly, a higher change in temperature (when cooling the glass tubes during the thermal treatment of step 150*b*) causes a greater contraction amount than a lower change in temperature. Furthermore, the duration of the thermal treatment can also affect the expansion or contraction amount in structural tubes 30**. For example, in a first example, a top end of a first glass tube was sealed prior to the drawing of the preform, the first glass tube having an inner diameter of 490 microns prior to the draw. During the draw, a bottom end of the first glass tube was sealed due to the draw process itself. Furthermore, during the draw, the first glass tube was exposed to a thermal treatment step by which the first glass tube was heated to 500° C. for about 10 minutes, causing the pressure of the gas within the first glass tube to increase to 0.126 psi. After the draw process, the glass tube had an inner diameter of 13.3 microns. Conversely, in a second example, a top end of a second glass tube was sealed prior to the drawing of the preform, the second glass tube also having an inner diameter of 490 microns prior to the draw. During the draw, a bottom end of the second glass tube was sealed due to the draw process itself. Furthermore, during the draw, the second glass tube was exposed to a thermal treatment step by which the second glass tube was heated to a temperature of about 500° C. for about 50 minutes, causing the pressure of the gas within the second glass tube to increase to 0.155 psi. After the draw process, the second glass tube had an inner diameter of 19.9 microns. The second glass tube was exposed to the heated temperature for a longer duration and, therefore, had a higher gas pressure during the thermal treatment step than the first glass tube.

Figure 6A:
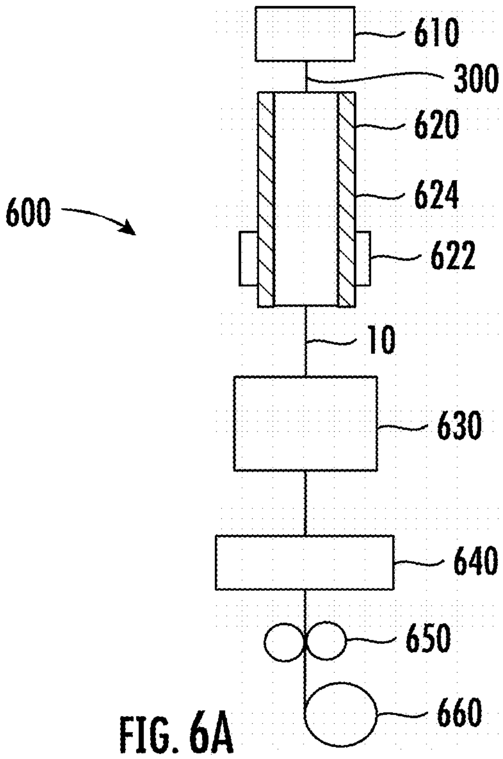
FIGS. 6A and 6B illustrate fiber drawing systems, according to embodiments of the present disclosure.

FIG. 6A depicts a fiber drawing system 600 that comprises a draw furnace 620 with a heating element 622 (e.g., a bottom heater) and a muffle 624. Preform 300 is disposed vertically in draw furnace 620, and heating element 622 of draw furnace 520 applies heat to second portion 360 of preform 300. An optical fiber 10 (in the form of a bare, uncoated optical fiber) is then drawn from the heated preform 300.

In order to draw fiber 10, second portion 360 of preform 300 is pulled by a tractor 650 and wound onto a spoon or reel 660. System 600 may comprise additional components such as a monitor 630 to monitor the draw speed of optical fiber 10. Additionally, system 600 may further comprise a coating apparatus 640. Optical fiber 10 is a bare, uncoated fiber until reaching coating apparatus 640, which may apply a polymeric-based coating to an outside surface of the bare optical fiber. The coated fiber may then pass through a coating curing apparatus (not shown) before being wound on reel 660.

As also shown in FIG. 6A, system 600 may further comprise a thermal treatment unit 610 above draw furnace 620. Therefore, first section 350 of preform 300 may be exposed to thermal treatment unit 610 while second section 360 of preform 300 is heated by heating element 622 of draw furnace 620. In some embodiments, thermal treatment unit 610 applies heat to first section 350 of preform 300 to increase the gas pressure within glass tubes 330 (as discussed above with reference to step **150*b* of process 100). In other embodiments, thermal treatment unit 610 cools first section 350 of preform 300 to decrease the gas pressure within glass tubes 330 (as also discussed above with reference to step 150*b* of process 100**).

Figure 6B:
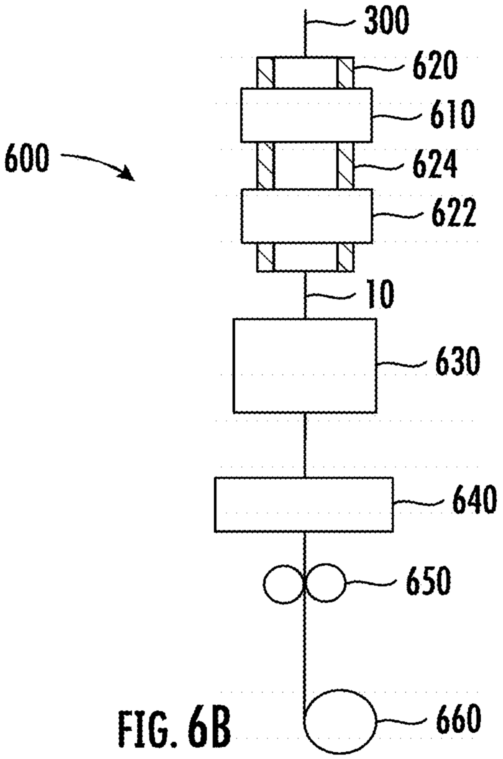

FIG. 6B shows a second embodiment of system 600 in which furnace 620 and thermal treatment unit 610 are one, unitary member. However, in this second embodiment of system 600, thermal treatment unit 610 is still disposed above and upstream of heating element 622.

In some embodiments, thermal treatment unit 610 is a heated sleeve, ring burner, heated air blower, induction coil, torch, isothermal heating element, laser including a CO or $CO_2$ laser, plasma heater, draw furnace heater, or any other heating element as is known in the art. Additionally or alternatively, thermal treatment unit 610 is a sprayer mechanism that sprays cooling gas or liquid (such as helium or nitrogen gas or liquid), dry ice, a refrigerator, or any other cooling element as is known in the art. In embodiments, thermal treatment unit 610 applies the heating/cooling function to only a specific number of glass tubes 330 (e.g., one, two, three, four, etc., glass tubes 330) or to all of the glass tubes 330 in preform 300. Thermal treatment unit 610 may apply the heat/cool function at a specific location along preform 300 (for example, at a specific location within draw furnace 620.

With reference to FIGS. 4, 6A, and 6B, thermal treatment unit 610 applies the heating/cooling function to first section 350 of glass tubes 330. In some embodiments, thermal treatment unit 610 heats/cools the entire length of first section 350. The heating/cooling function may be uniform along first section 350 or may be in a gradient. For example, a top portion of first section 350 may be heated to a higher temperature or at a faster rate than a bottom portion of first section 350. In other embodiments, thermal treatment unit 610 heats/cools less than an entire length of first section 350. Thermal treatment unit 510, for example, may heat/cool a length of first section 350 that is about three-fourths, two-thirds, one-half, one-third, or one-fourth the length of first section 350.

It is also noted that during the drawing of preform 300, second section 360 of preform 300 is heated to a higher temperature than first section 350 of preform 300 in order to produce the root forming portion at second section 360. Therefore, in embodiments, formation of the root forming portion requires a higher glass temperature than the temperature to increase the pressure within glass tubes 330.

The heating of preform 300 by thermal treatment unit 610 and heating element 622 may create at least two hot zones on preform 300, the first hot zone being within first section 350 and the second hot zone being within second section 360. The first hot zone may be less than or equal to the entire length of first section 350. Furthermore, the first hot zone may be used to control the size of structural tubes 30, while the second hot zone is used to form the root forming portion to draw fiber 10. As discussed above, the second hot zone may have a higher temperature than the first hot zone. With the first and second hot zones, the temperature profile along the length of preform (during the draw process) may be referred to as a bimodal gaussian.

Due to the heating/cooling function of thermal treatment unit 610, preform 300 may undergo a change in temperature within a range from about 50° C. to about 250° C. Therefore, in one exemplary embodiment, preform 300 may have a first temperature before entering thermal treatment unit 610 and a second temperature upon exiting thermal treatment unit 610, such that the second temperature is about 50° C. to about 250° C. higher than the first temperature. In other embodiments, the second temperature is about 50° C. to about 250° C. lower than the first temperature. It is also contemplated that the change in temperature, due to the heating/cooling function of thermal treatment unit 610, is from about 50° C. to about 200° C., or about 100° C. to about 175° C., or about 50° C. to about 150° C.

Thermal treatment unit 610 may operate at a heating rate of about 1° C. per second or higher, or about 5° C. per second or higher, or about 10° C. per second or higher, or about 20° C. per second or higher, or about 25° C. per second or higher, or about 50° C. per second or higher, or about 75° C. per second or higher, or about 100° C. per second or higher, or about 150° C. per second or higher, or about 200° C. per second or higher, or about 250° C. per second or higher, or about 300° C. per second or higher, or about 350° C. per second or higher. In some embodiments, the heating rate is in a range from about 100° C. per second to about 350° C. per second, or about 150° C. per second to about 300° C. per second, or about 200° C. per second to about 250° C. per second. Furthermore, thermal treatment unit 610 may operate at a cooling rate of about −1° C. per second or lower, or about −5° C. per second or lower, or about −10° C. per second or lower, or about −15° C. per second or lower, or about −20° C. per second or lower, or about −25° C. per second or lower, or about −30° C. per second or lower, or about −40° C. per second or lower, or about −50° C. per second or lower, or about −60° C. per second or lower, or about −70° C. per second or lower, or about −80° C. per second or lower, or about −90° C. per second or lower, or about −100° C. per second or lower. In some embodiments, thermal treatment unit 610 operates at a cooling rate from about −5° C. per second to about −50° C. per second, or about −10° C. per second to about −40° C. per second, or about −20° C. per second to about −35° C. per second, or about −25° C. per second to about −35° C. per second.

It is contemplated, in some embodiments, that thermal treatment unit 610 and heating element 622 in furnace 620 are one member. Therefore, in these embodiments, heating element 622 may be used to both (i) heat second section 360 of preform 300 to draw a fiber from the root portion of preform 300 and (ii) heat/cool first section 350 of preform 300 to cause the gas pressure within capillaries 335 to increase/decrease.

In some exemplary embodiments, a pressure within furnace 620 may be used to control the pressure within glass tubes 330. Such may be used in addition to the thermal treatment of step 150*b* of process 100. For example, during the thermal treatment of step 150*b*, the pressure within furnace 620 may be controlled to facilitate the change in pressure within glass tubes 330. A relatively higher pressure within furnace 620 may require a lower temperature change (by, for example, thermal treatment unit 610) in order to increase the gas pressure within glass tubes 330. Conversely, a relatively lower pressure within furnace 620 may require a higher temperature change (by, for example, thermal treatment unit 610) in order to increase the gas pressure within glass tubes 330. In embodiments, the relationship between the pressure within the furnace, the pressure within the glass tubes, and the temperature of the glass tubes may be optimized to provide the desired capillary size and structural tube wall thickness in the drawn optical fiber.

Exemplary Examples

Figure 7A:
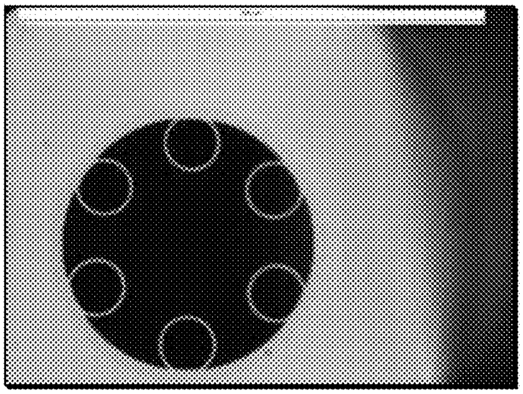
FIGS. 7A-7D illustrate cross-sectional views of exemplary examples of hollow core optical fibers, according to embodiments of the present disclosure.
Figure 7B:
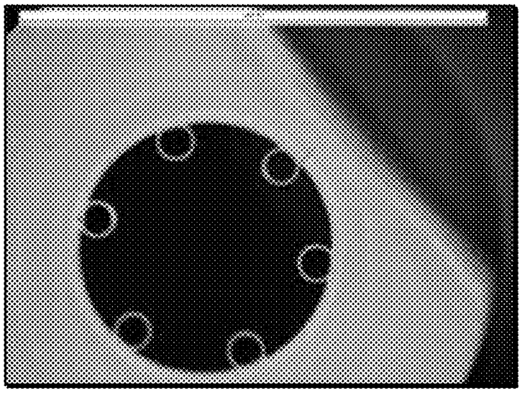
Figure 7C:
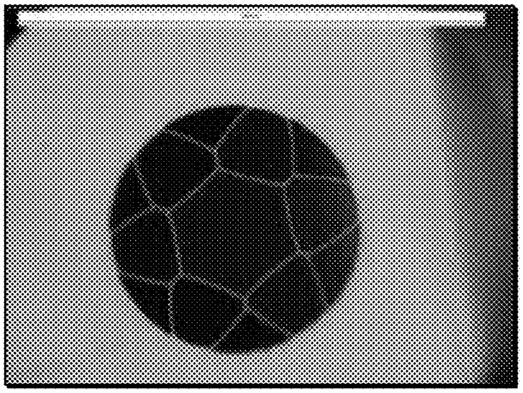
Figure 7D:
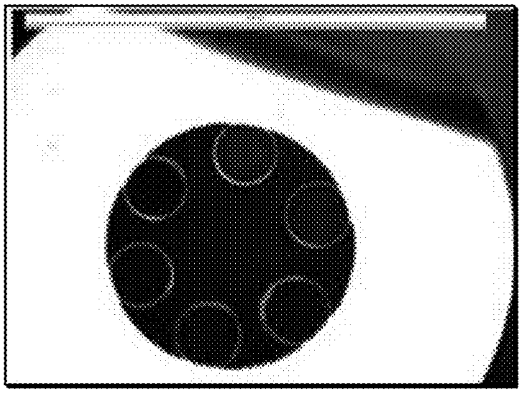

In a first exemplary example, hollow core preform precursors were each formed by positioning six glass tubes in a glass cladding tube. The glass tubes were evenly spaced around an inner diameter of the glass cladding tube such that adjacent glass tubes were separated by a gap. Each glass tube had an inner diameter of 7 mm and an outer diameter of 9 mm. The glass cladding tube had an inner diameter of 40 mm and an outer diameter of 50 mm. Next, the preform precursors were elongated so that an outer diameter of the glass cladding tube was reduced to 15 mm. Then, additional soot was deposited on the precursors, and the precursors were consolidated to preforms. The preforms were then drawn into hollow core optical fibers. During the draw process: (i) the glass tubes of a first preform were drawn according to a traditional draw process without the thermal treatment disclosed herein, (ii) the glass tubes of a second preform were exposed to a thermal treatment by cooling the glass tubes at a temperature of −10° C. for a duration of 2 minutes at a cooling rate of −10° C. per minute, (iii) the glass tubes of a third preform were exposed to a thermal treatment by heating the glass tubes at a temperature of 250° C. for a duration of 2 minutes at a rate of 100° C. per minute, and (iv) the glass tubes of a fourth preform were exposed to a thermal treatment by heating the glass tubes at a temperature of 200° C. for a duration of 2 minutes at a rate of 100° C. per minute. FIG. 7A shows the drawn fiber made using the traditional draw process of (i) above. FIG. 7B shows the drawn fiber made using the exemplary process of (ii) above. FIG. 7C shows the drawn fiber made using the exemplary process of (iii) above. And FIG. 7D shows the drawn fiber made using the exemplary process of (iv) above.

As shown in FIGS. 7A and 7B, the cooling of the glass tubes during the draw step caused the structural tubes in the drawn fiber to have a relatively smaller size. As shown in FIGS. 7A, 7C, and 7D, the heating of the glass tubes during the draw step caused the structural tubes in the drawn fiber to have a relatively larger size.

Table 1 below provides an example of a hollow core fiber made using a traditional process without a thermal treatment step (the Comparative Fiber) and a hollow core fiber made using a thermal treatment step, as disclosed herein, (the Exemplary Fiber). During the thermal treatment of the Exemplary Fiber, the preform was heated to a temperature of 250° C. for the entirety of the draw of the fiber.

TABLE 1

| | Comparative Fiber | Exemplary Fiber |
|---|---|---|
| Number of Structural Tubes | 6 | 6 |
| Inner Diameter of Structural Tubes After Draw | 13.0 microns | 21.8 microns |
| Outer Diameter of Structural Tubes After Draw | 14.5 microns | 22.6 microns |
| Wall thickness of Structural Tubes After Draw | 0.75 microns | 0.4 microns |
| Outer Diameter of Fiber After Draw | 200 microns | 200 microns |

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments but should be defined only in accordance with the following claims and their equivalents.

What is claimed is:

1. A method of manufacturing a hollow core optical fiber, the method comprising:

positioning at least one glass tube in a glass outer cladding to form a preform precursor, the glass tube comprising an inner capillary, a first open end, and a second open end;

forming a preform from the preform precursor;

drawing the preform into a hollow core optical fiber; and while drawing the preform, thermally treating the preform by heating at least a portion of the preform to increase gas pressure within the glass tube, wherein heating the glass tube increases an outer diameter of the inner capillary and decreases a wall thickness of the glass tube and wherein the thermally treating comprises heating the portion of the preform at a heating rate of about 100° C. per second to about 350° C. per second.

2. The method of claim 1, wherein the thermally treating comprises heating the portion of the preform to a temperature of about 200° C. or greater.

3. The method of claim 2, wherein the thermally treating comprises heating the portion of the preform to a temperature from about 200° C. to about 500° C.

4. The method of claim 1, wherein the thermal treatment is applied to a first section of the preform, a second section of the preform being a root forming portion of the preform.

5. The method of claim 4, wherein:

the thermal treatment comprises heating the first section of the preform to a first temperature, the drawing of the preform comprises heating the second section of the preform to a second temperature, and the first temperature being less than the second temperature.

6. The method of claim 5, wherein the first temperature is below the strain point of the glass tube.

7. The method of claim 1, further comprising sealing the first open end of the glass tube.

8. The method of claim 7, wherein the first open end of the glass tube is sealed while gas within the glass tube is at a temperature of about 25° C.

9. The method of claim 1, wherein the glass tube forms a structural tube in the drawn hollow core optical fiber.

10. The method of claim 1, wherein the at least one glass tube comprises a second glass tube, the thermally treating comprising heating the glass tube to increase gas pressure within the glass tube, and the method further comprising cooling the second glass tube to decrease gas pressure within the second glass tube.

11. The method of claim 1, wherein the at least one glass tube comprises a second glass tube, the thermally treating comprising heating the glass tube to a first temperature to increase gas pressure within the glass tube, and the method further comprising heating the second glass tube to a second temperature to increase gas pressure within the second glass tube.

12. The method of claim 11, wherein the first temperature is greater than the second temperature.

13. The method of claim 1, further comprising creating a first hot zone and a second hot zone, the first hot zone controlling size of the at least one glass tube in the drawn hollow core optical fiber and the second hot zone forming a root forming portion of the preform.

14. The method of claim 1, wherein the heating rate is about 150° C. per second to about 300° C. per second.

15. A method of manufacturing a hollow core optical fiber, the method comprising:

positioning at least one glass tube in a glass outer cladding to form a preform precursor, the glass tube comprising an inner capillary, a first open end, and a second open end;

forming a preform from the preform precursor;

drawing the preform into a hollow core optical fiber; and while drawing the preform, thermally treating the preform by cooling at least a portion of the preform to decrease gas pressure within the glass tube, wherein cooling the glass tube decreases an outer diameter of the inner capillary and increases a wall thickness of the glass tube.

16. The method of claim 15, wherein the thermally treating comprises cooling the portion of the preform to a temperature of about 50° C. or less.

17. The method of claim 16, wherein the thermally treating comprises cooling the portion of the preform to a temperature from about −100° C. to about 50° C.

18. The method of claim 15, wherein the glass tube forms a structural tube in the drawn hollow core optical fiber.

* * * * *